United States Patent [19]

Witek

[11] Patent Number: 5,461,488
[45] Date of Patent: Oct. 24, 1995

[54] COMPUTERIZED FACSIMILE (FAX) SYSTEM AND METHOD OF OPERATION

[75] Inventor: Keith E. Witek, Austin, Tex.

[73] Assignee: Motorola, Inc., Schaumburg, Ill.

[21] Appl. No.: 304,337

[22] Filed: Sep. 12, 1994

[51] Int. Cl.⁶ .............................. H04N 1/21; H04N 1/32
[52] U.S. Cl. .......................... 358/402; 358/407; 358/442; 358/444; 358/440; 395/492; 395/500; 395/182.13; 395/600; 395/650; 364/419.03; 364/419.07
[58] Field of Search ...................................... 358/402, 407, 358/434, 440, 468, 442, 444; 379/100; 395/200, 325

[56] References Cited

U.S. PATENT DOCUMENTS 5,091,790  2/1992  Silverberg ............................. 358/407
5,175,684 12/1992  Chong ..................................... 379/100
5,247,591  9/1993  Baran ..................................... 358/402
5,287,199  2/1994  Zoccolillo ............................. 358/402

Primary Examiner—Scott A. Rogers
Attorney, Agent, or Firm—Keith E. Witek

[57] ABSTRACT

A fax system is automated herein by using a modem (10), a computer (12), and an office network which coupled the computer (12) to a plurality of end-user computers (26). A fax is received by the computer (12) through the modem (10). Once the fax is received by the computer (12), a program (14) stores the fax in a computer file (15) in a non-text format. Code (18) converts the non-text format of file (15) to a text format (17) which is read by a pattern recognition program (18). The program (18) determines, from the file (17), a destination of the fax document. The destination can be one or more of a printer (24), a computer in the plurality of computers (26), a default computer, or a default storage location (e.g., disk storage). A log file (19) is kept by computer (12) to record the operations of the computer (12) and receipt and routing information regarding received faxes. The control code (22) coordinates the other programs in memory (13).

39 Claims, 2 Drawing Sheets

COMPUTERIZED FACSIMILE (FAX) SYSTEM AND METHOD OF OPERATION

FIELD OF THE INVENTION

The present invention relates generally to computerized or data processing systems, and more particularly, to computerized facsimile routing and logging systems and methods.

BACKGROUND OF THE INVENTION

Thus use of facsimile (Fax) transmissions is becoming increasingly popular as companies and business expands to nation-wide and global-wide markets. The need to communicate with remote locations is an increasingly important function. In the past, Fax machines have been used to receive Fax transmissions from a phone line and print the Fax transmission to paper. The paper was then hand routed by a human user to a proper destination.

In many cases, the Fax could be lost in the recipient's in-basket, mis-routed, or routed long after the Fax was sent. In some cases, Faxes need to be logged on paper or in a database for future reference which takes a considerable amount of man hours. In addition, the Fax document, which are received in a paper format, cannot be electronically modified or changed by a recipient in a time efficient and easy manner. In addition, some Faxes are sent simply to pass information which need not be permanently fixed on paper. Due to the above complications, a more automated Fax logging and routing system is needed.

Figure 1:
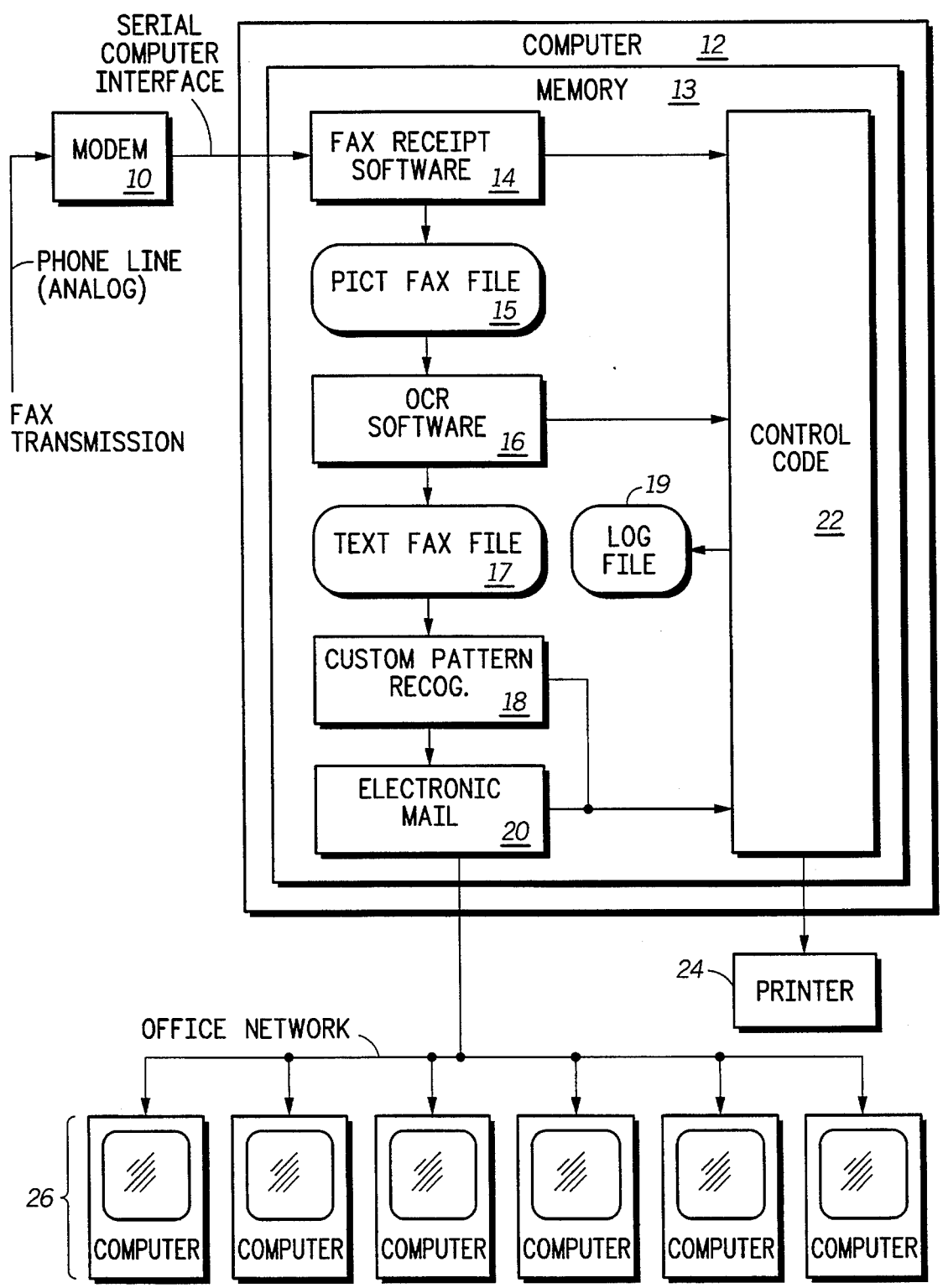
FIG. 1 illustrates, in a block diagram, a fax data processing system in accordance with the present invention.

It will be appreciated that for simplicity and clarity of illustration, elements illustrated in the FIGURES have not necessarily been drawn to scale. For example, the dimensions of some of the elements are exaggerated relative to other elements for clarity. Further, where considered appropriate, reference numerals have been repeated among the FIGURES to indicate corresponding or analogous elements.

DESCRIPTION OF A PREFERRED EMBODIMENT

FIG. 1 illustrates a system used to automate facsimile ("fax") logging and routing via a computerized system. FIG. 1 illustrates a modem 10. Modem 10 (a serial communication device) has an input, which is illustrated in FIG. 1 as being an analog phone line. In general, any compatible telecommunication or communication protocol may be used as input to the modem 10. The modem 10 can be any serial communication device which can interface data from a phone line, communication line, and/or network to a computer. The modem 10 can operate an any speed, from 300 baud to 28.8 baud or above. The modem 10 is coupled to a computer 12 via a serial computer interface. Any serial computer interface which is either parallel or serial in nature can be used for the serial computer interface in FIG. 1. Typically, the serial computer interface in FIG. 1 contains a plurality of conductors to either transmit a plurality of data bits, a plurality of control signals, and/or handshaking signals.

FIG. 1 illustrates a computer 12. Computer 12 is also referred to as a control computer and is any device which either manipulates, stores, routes, or transmits data in any manner. In one form, computer 12 can be any computer which comprises one or more of a display screen, a keyboard, a mouse, or a CPU/Memory unit. In other forms, the computer 12 may be a microcontroller, a DSP, a microcontrolling unit, a plurality of microprocessors, a mainframe, a supercomputer, or any like computer device. The computer has either external to it or internal to it access to a memory 13, illustrated in FIG. 1. Memory 13 is comprised of one or more of disk storage, tape storage, magnetic media, nonvolatile memory, EPROM memory, EEPROM memory, FLASH memory, DRAM memory, SRAM memory, ROM, CD memory, computer memory, and/or any like memory system or device.

Within memory 13 is a fax receipt software program 14. Program 14 is generally used to receive data from the serial computer interface and store it into a pict fax file 15. The pict fax file 15 stores information received which is received through the modem 10 and processed by program 14. The information in fax file 15 is typically one or more fax transmissions or fax documents received through modem 10 via the serial computer interface. In general, the fax receipt software 14 allows the computer 12 to simulate or "look like" a fax machine to another fax machine coupled to the modem 10 via the phone line. The fax software 14 is designed to primarily receive fax transmissions of the CCITT group III type. Other transmission forms and protocols may also be supported and recognized by fax receipt software 14. Fax software 14 also recognizes various fax and coding schemes, such as Huffman encoding, and can be used to communicate at any standard telecommunication speed such as 14.4 kBaud, 12 kBaud, 9.6 kBaud, 7.2 kBaud, 4.8 kBaud, 2.4 kBaud, etc. Also, the fax receipt software 14 is coded to dynamically and automatically match the transmission speed of the data coming in through the modem 10. The fax receipt software program 14 has the primary purpose of receiving one or more fax transmissions through the modem 10 and processing that fax transmission into a data format stored in the pict fax file 15, which can be subsequently processed.

In some cases, many faxed transmissions will be received in a short period of time and multiple pict fax files 15 will be created. A control code portion 22 is typically used to monitor the fax receipt software program 14 to insure data is not lost and that proper management of multiple files is carried out by the computer 12. The pict fax files 15 may either be prioritized by time or by a fax transmitting urgency or a like priority. Once one or more pict fax files 15 have been formed via program 14, optical character recognition (OCR) 16 is used to process the pict fax file 15. If more than one fax file 15 exists within memory 13 at one point in time, control code 22 determines via the priority scheme discussed above, which pict fax file 15 is processed in which order by the software 16. The primary purpose of the OCR software 16 is to scan one or more pict fax files 15 and translate those pict fax files 15 from a non-text format to a text format. The text format, which is stored in text fax file 17, may be represented in one of many manners such as ASCII, binary, BCD, and/or the like. In one form, the OCR software 16 converts only a portion of the pict fax file 15 to text, and in another form the OCR software 16 will convert the entire pict fax file 15 to text fax file 17. In either case, the OCR software 16 is converting the pict fax file 15 to a text fax file for at least one primary purpose. This primary purpose is to determine from the faxed data any information which is needed to electronically log or track the fax transmission and determines where to properly route the fax transmission (i.e., a fax destination).

All fax documents contain a cover sheet, or a like sheet, which communicates to a human user: (1) who the fax is from; and (2) where the fax is to be sent, along with other optional information. For example, a fax from Company A may have Company B's name on the cover sheet as a recipient. A fax sent from a John Smith to a Bill Johnson would have John Smith as the sender on the cover sheet and a Bill Johnson as the recipient on the cover sheet. In addition, the cover sheet may contain additional information such as a legal clause of legal confidentiality, a number of pages transmitted, phone numbers in which to contact individuals, and like information. In some cases, a fax document will contain high resolution or low resolution graphics which may be drawings, figures, company logos, or the like. Typically, these drawings within the pict fax file are not converted to text by the OCR software 16, but remain in a graphics format. The OCR software 16 is typically looking for one or more pieces of information from this "cover sheet".

Once the OCR software 16 has generated the text fax file 17, the control code 22 initiates custom pattern recognition via custom pattern recognition code 18. Custom pattern recognition code 18 contains a plurality of predetermined or preselected text or text strings. These text strings contain names which identify a destination of all potential faxes that can be received by computer 12. For example, if four people can receive faxes from the link establishes via computer 12 and the office network, four names will be stored in the custom pattern recognition code 18 to determine which of the four recipients should receive the fax. In many cases, one person or one destination will be the recipient of a fax, but in certain circumstances custom pattern recognition code 18 may find that several or multiple destinations are needed in order to route the fax properly.

In many cases, when writing a cover sheet for a fax, or when generating a fax cover sheet via computer, mistakes are made. For example, typos may occur, names may be misspelled, or the OCR software may not have properly recognized the name on the coversheet. In this case, the custom pattern recognition 18 either contains multiple strings which identify a particular user (i.e., "David Johnson", "Dave", "johnson", "Dave Johnson", "Johnson", "dave", "david", "jonson", "Jonson" etc.) or employs a pattern recognition scheme which is used in spelling checkers to identify misspelled words in a "error minimization" manner. This error scheme which is used in spelling checker matches misspelled or mis-recognized words to a list of valid words and determines which valid word in the list of valid words either closely matches or significantly matches the misspelled word read from file 17. This error correction system is typically performed by a numerical weight factor which is generated on a character-by-character comparison basis between strings stored via code 18 and strings parsed in the text fax file 17. For example, the parsed string from the text fax file 17 may be, for example, "Riek". In the database accessed by code 18, no "Reik" exists. Instead, the code 18 identifies a "Rick", "Rich", "Rieker", etc. The code 18 uses a numerical error weight scheme to determine which, if any, string from "Rick", "Rich", "Rieker", etc. is closest to the parsed term "Reik" from the file 17.

Once the code 18 recognizes one or more destinations of the fax received via the modem 10, the fax is routed via an electronic mail program 20 to the proper destination. The proper destination may be identified by the E-mail program 20 via an address, a user name, a numerical value, a network identifier, or any like identification means which can be found or identified via one or more of code 18 and E-mail program 20. E-mail program 20 can communicate across either telecommunication lines, local area networks, token passing networks, serial computer interfaces, parallel computer interfaces, buses, or any like computer communication means to transmit the faxes received by modem 10 to the destinations identified by the customer pattern recognition code 18.

In FIG. 1, six possible destinations are illustrated via six computers 26. In a preferred form, more than one destination is attached to the office network through the E-mail program 20. It is important to note that any number N of destinations, computers, or users can be coupled to the e-mail code 20 via the office network wherein N is a finite positive integer. In addition, the end user may not always be a computer 26, but a specific folder, directory, or disk area on a computer, a default computer, a disk drive/tape drive, a computer screen, a printer, or the like.

The control code 22 will interact with one or more of software 14, software 16, pattern recognition code 18, and E-mail program 20 to coordinate the execution of these software programs and to record information regarding the processes performed by computer 12. For example, control code 22 can prioritize, memory manage, and garage collect pict fax files 15 as they are processed by software 14 and software 16. In addition, the control code can communicate with the pattern recognition code 18 and the E-mail program 20 to store fax receipt times, processing errors, information regarding destination identification, and time of transmission along the office network.

Since the control code 22 functions as a coordinator for the entire system illustrated in computer 12, the control code contains valuable information as to the receipt and transmission of faxed documents. This information can be stored in a log file 19 for subsequent reference and future use. The log file 19 is generated by the control code 22 and has optional or required (depending upon a system set-up) entries for each fax received by the modem 10 and processed by the computer 12. It is important to note that some fax receipts may be intended for logging, while other fax receipts or transmissions may be indicated as transmissions which should not be logged in another form. In most cases, the fax transmission will be logged so that the receipt and routing of the fax can be determined at a later date. The log file 19 will contain, per fax, information such as the time and date of receipt by the program 14, the time of the generation of file 15, any complications or information regarding the OCR software 16, the time the text fax file 17 was generated, the destinations determined by the code 18, the time and destinations transmitted by the e-mail program 20, user information from computers 26 when logging onto or accessing the computer 12, number of pages received per faxed transmission, the sender of the fax, phone numbers, addresses, and any other information which could be regarded as useful to a facsimile user or sender.

In some cases, either the OCR software 16 will not properly convert the pict faxed file 15, or the custom pattern recognition 18 will either not notice a user connected via the office network or not be able to determine a user within the proper error tolerances (see above). In these cases, the fax will either be stored by the control code in a default storage location for access at a subsequent time or will be transmitted via the office network to a default computer which can be accessed by a system administrator or secretary who is then responsible for the hand-routing of the faxes which are not properly handled by computer 12. In another form, the fax can simply be printed via a hardware printer 24 and routed by hand via human personnel or stored to a default disk space for access by all users of computers 26.

The system illustrated in FIG. 1 has several advantages. One advantage is that the system of FIG. 1 may be used as a scanner. The scanner function of FIG. 1 is discussed as follows. If a fax machine is coupled to the fax transmission phone line of FIG. 1, then a user can fax a paper document to himself/herself. This faxed paper document is received by the modem 10 from the fax machine and processed by computer 12 to a text fax file 17. This file 17 is subsequently mailed to the user identified on the cover sheet of the faxed transmission (in this case, the user is the person who sent the fax in the first place). Therefore, if one were to fax himself a document through the computer 12, that document would be sent to his/her computer 26 as a text file and not a paper file or pict file. Therefore, fax or paper documents can be converted by computer 12 to text computer formats which can be edited and changed by a user coupled via a computer 26 to the computer 12.

In addition, the man hours required to keep track of one or more fax machines by secretaries and/or support staff is very time consuming. By using the system illustrated in FIG. 1, man hours required to log and route faxes are significantly reduced compared to the prior art. Prior art fax machines operate by printing out a document received on a phone line and leaving the document for a human user to pick up and distribute. This technique is not secure, due to the fact that any user can grab the printed copy off of the fax machine and mis-route, steal, or illegally access the material transmitted. The system of FIG. 1 ensures a higher level of security since only those destined to receive the fax are those with access to the fax since there exists computer security measures to prevent others from logging into computers 26 if not authorized to do so. In addition, the computer 12 may contain a large amount to security software to avoid viruses and unauthorized access.

When a fax is printed on paper in a prior art fax, the faxes need to be routed by human personnel and may be lost, routed late, or routed incorrectly. Once lost, routed incorrectly, or routed late, the fax can usually not be regained and resubmitted to its final destination. The system of FIG. 1 prevents this loss by storing the received fax permanently on disk or a like media and ensures that the fax will be routed to an end user in a timely, efficient, and secure manner. In addition, the system of FIG. 1 ensures extensive and proper logging of the receipt and communication of fax files without extensive human interaction. In many cases, faxes are transmitted to communicate routine information between offices and is not required to be on printed paper for storage. Therefore, the system of FIG. 1 is environmentally sound in that it saves paper when a fax need not be recorded on paper and only viewed by a user on a computer screen.

It is important to note that the E-mail program 20 can route one or more of either the text fax file 17 or the pict fax file 15 depending upon conditions set within the computer 12. In some cases, a sender will want the end user coupled to computer 26 not to have textural access to his file so that the file cannot be changed or edited in a easy manner. In another form, the sender may wish to have the end user change the facsimile or edit the facsimile, in which case the text fax file 17 is communicated by the E-mail program 20. In many cases, the text fax file can be E-mail transmitted in a much faster time than any pict file. It is also important to note that the OCR software 16 can use one of any known techniques to recognize not only computer-generated cover sheets comprising senders and destinations, but senders and destinations written by hand on a cover sheet of a facsimile document. In addition, translation software which translates a document from one language to another (e.g. Japanese to English or vice versa) may be incorporated into the OCR software 16 or may be added as a new module in FIG. 1. The OCR software 16 can then recognize and translate facsimile senders, destinations, and text from foreign languages to English (and vice versa) so that a recipient and sender need not speak the same language.

It is important to note that the software 14, software 16, pattern recognition 18, and E-mail program 20 may be "pipelined" in order to achieve greater throughput of faxes through the computer 12. For example, a first fax may be in the process of being received by software 14 or may be in the process of being written to a fax file 15, while a second fax is being OCR converted via the software 16 to a file 17, while a third fax is being pattern recognized via code 18, while a fourth fax is being routed via the E-mail program 20. This technique will also ensure that one slow software portion within computer 12 does not entirely slow the entire fax receiving process. For example, if the fax receipt software 14 can receive faxes faster than the OCR software can convert faxes, then the fax receipt software 14 can stack or queue pict fax files 15 and not slow receipt of faxes through the fax transmission phone line in the modem 10. In another form, if a "bottle-neck" is found wherein one of the software 14, 16, 18, or 20 is slowing the process, this slower program may be augmented by adding similar processing capability in parallel to the slow program to improve throughput (i.e. parallel software processing).

Figure 2:
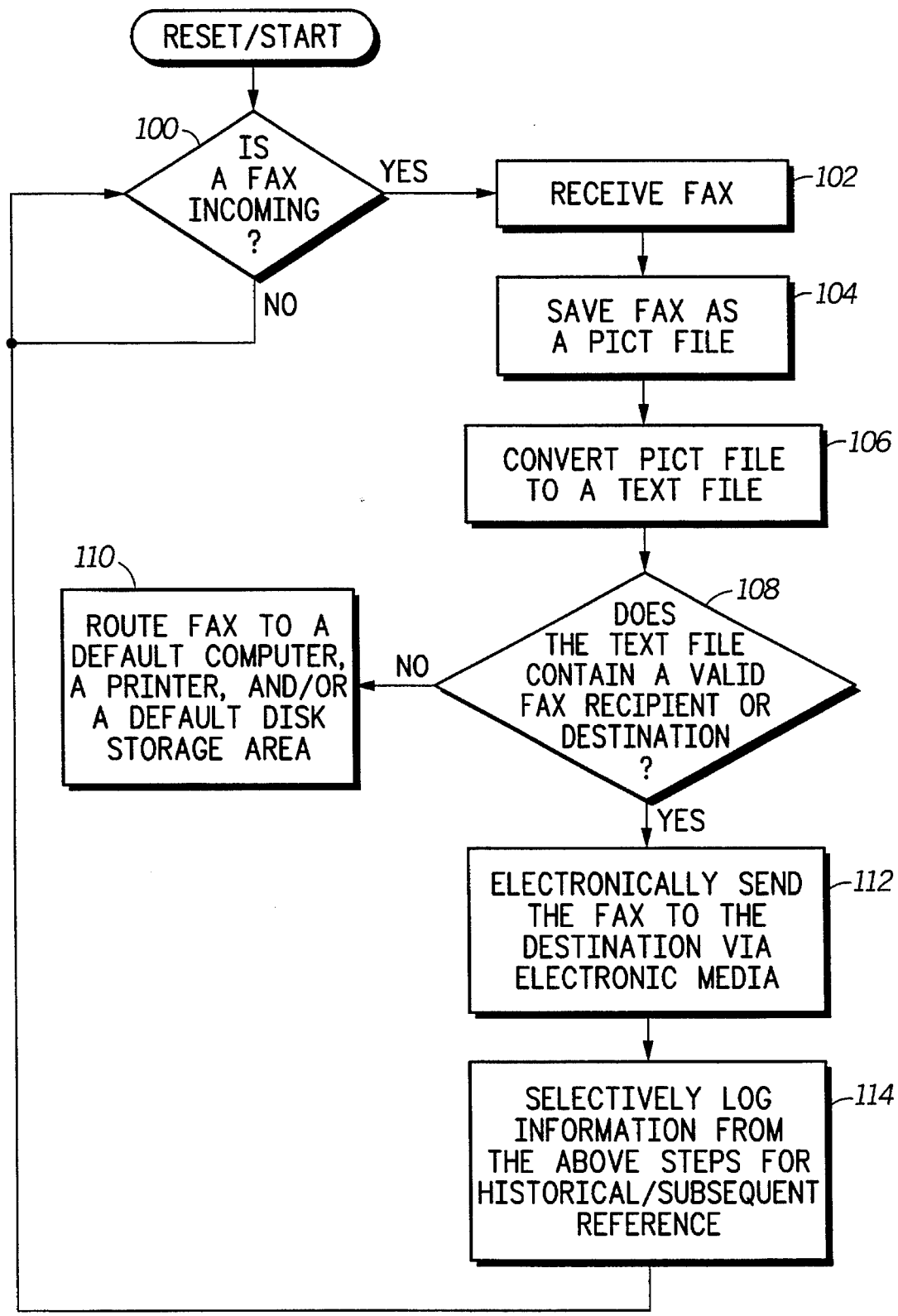
FIG. 2 illustrates, in a flowchart, a method for performing computerized routing and tracking of fax documents in accordance with the present invention.

FIG. 2 illustrates a flow chart which describes the operation of the system illustrated in FIG. 1. In FIG. 2, a step 100 is used to determine if a fax is incoming from modem 10 into the computer 12. If a fax is not currently being received by computer 12, the fax receipt software 14 may continue to poll the modem or watch the serial computer interface line for incoming information, or the computer 12 can selectively disable and enable the fax software in a periodic manner to enable time multiplexing of the processor within computer 12 so that other tasks may be performed other than waiting for a fax to come in along the serial computer interface. Once a fax transmission is identified as being received via the serial computer interface, a step 102 receives the fax via software 14. The fax is then saved either after receipt or during receipt to a pict fax file 15 in a step 104. Once the file 15 in FIG. 1 is formed, a step 106 uses the software 16 to convert the file 15 to a file 17, wherein file 17 is a text format. Once step 106 is performed, a step 108 checks the text fax file 17 or FIG. 1 to determine if a valid recipient or destination or a plurality of valid recipients/ destinations are found from documentation within the fax received by the serial computer interface. If the pattern recognition code 18 cannot find a valid destination via step 108, then the fax is routed to a default computer, printed to a printer, and/or stored at a default disk storage area. Optionally, this situation wherein a fax destination is not properly identified can be flagged to a network operator, secretary or user so that the unrecognizable destination may be fixed in the future.

Once a destination is recognized, a step 112 is used to electronically send the fax to the destination via electronic media or an E-mail protocol. The information sent may either be the text file 17 and/or the pict file 15. In some cases, it may suffice to send notice to a user that the fax was received with information regarding where to go on a network to obtain the fax information. During the steps 100–112 or after the steps of 100–112 have been executed, a step 114 logs in a log file 19 various information discussed herein which relates to the fax transmission. After the fax is processed via step 114, step 100 is re-executed in order to process another fax received via the serial computer interface.

While the present invention has been illustrated and described with reference to specific embodiments, further modification and improvements will occur to those skilled in the art. For example, "code", as used herein, or "program", as used herein, is any plurality of binary values or any executable, interpreted or compiled code which can be used by a computer or execution device to perform a task. This code or program can be written in any one of several known computer languages. A "computer", as used herein, can mean any device which stores, processes, routes, manipulates, or performs like operation on data. A "modem" is any serial communication device which can be used for taking fax information and inputting the fax information into a computer. A "text file" or "textural format", as used herein, may be any data format for efficiently storing alphanumerical data. In general, a text file or text format is any data structure which identifies individual alphanumeric characters letters, or language characters from any faxed transmission. A "string", as used herein, is one or more alpha numeric or textural characters which are identified as being part of a group (such as a human name). The computers 26 herein may be any type of computer or destination which may not necessarily require display devices, user input devices, or memory. For example, an end-user or destination 26 may simply be a disk drive. It is to be understood, therefore, that this invention is not limited to the particular forms illustrated and that it is intended in the appended claims to cover all modifications that do not depart from the spirit and scope of this invention.

What is claimed is:

1. A data processing system for processing facsimile (FAX) transmissions, the data processing system comprising:

a serial communication device having an input for receiving facsimile data from a serial communication line and an output for providing the facsimile data;

a control computer coupled to the output of the serial communication device;

a default computer which is coupled to the control computer for receiving the facsimile data if the data processing system cannot correctly determine where to route the facsimile data;

a memory portion coupled to the control computer comprising:

software for receiving the facsimile data from the serial communication device and storing the facsimile data in a first data file in a first format;

software for converting a portion of the first data file to a second format; and software which uses the second format to determine where to route the facsimile data within the data processing system; and wherein at least one of the software for receiving, the software for converting, or the software which uses the second format interfaces with control software to keep a log file, the log file storing information regarding the facsimile data, the information being selected from a group consisting of: facsimile data length, time of receipt of the facsimile data, time of routing of the facsimile data, a destination to which the facsimile data was routed, and where or who the facsimile data was transmitted from.

2. The data processing system of claim 1 wherein the software for converting is an optical character recognition (OCR) method which produces a character output file.

3. The data processing system of claim 1 wherein a printer is coupled to the control computer for paper printing of the facsimile data.

4. The data processing system of claim 3 wherein the facsimile data is printed if the software for converting fails to properly convert the first format to the second format.

5. The data processing system of claim 1 wherein the software which uses the second format attempts to match one string within a plurality of stored strings from memory to one string in the second format in order to determine where to route the facsimile data in the data processing system.

6. The data processing system of claim 5 wherein the one string in the second format is a name of a user and indicates a destination computer wherein the destination computer is coupled to the control computer, the facsimile data being routed to the destination computer by passing the facsimile data and a destination address over a local area network.

7. The data processing system of claim 1 wherein the default computer which is coupled to the control computer is accessed by a human user to determine where to route the facsimile data by electronic mail.

8. The data processing system of claim 1 wherein the software for receiving converting creates a second data file which contains textual information and a control signal determines whether the first data file or the second data file is routed by the software which uses the second format.

9. The data processing system of claim 1 wherein at least one of the software for receiving, the software for converting, the software which uses the second format, and the log file are stored in the memory portion.

10. The data processing system of claim 9 wherein the in order to determine a destination the data processing system translates the facsimile data from a first human language to a second human language.

11. The data processing system of claim 1 wherein the serial communication device is a modem operating at a communication rate above 2400 baud.

12. The data processing system of claim 1 wherein a plurality of computers are coupled to the control computer and any one computer in the plurality of computers is a destination computer where the software which uses the second format transmits the facsimile data to the destination computer.

13. The data processing system of claim 12 wherein more than one computer in the plurality of computers can be the destination computer.

14. The data processing system of claim 1 wherein the software which uses the second format transmits the facsimile data to a destination by using an electronic mail program resident within the control computer and destination computer.

15. The data processing system of claim 1 wherein the input of the serial communication device is coupled to a telecommunication conductive line.

16. A data processing system for processing facsimile (FAX) transmissions, the data processing system comprising:

a serial communication device having an input for receiving facsimile data from a serial communication line and an output for providing the facsimile data;

a control computer coupled to the output of the serial communication device for receiving the facsimile data;

a memory portion coupled to the control computer comprising:
software for receiving the facsimile data from the serial communication device and storing the facsimile data in a first data file in a first format;
software for converting the first data file to a second format which is stored in a second data file; and
software which uses the second format in the second data file to determine where to route the facsimile data within the data processing system;
a default computer which is coupled to the control computer for receiving the facsimile data if the software which uses the second format cannot correctly determine where to route the facsimile data in the data processing system; and
wherein at least one of the software for receiving, the software for converting, or the software which uses the second format interfaces with control software to keep a log file, the log file storing information regarding the facsimile data, the information being: (1) a time indicator for either receipt or final destination routing of the facsimile data; (2) a destination to which the facsimile data was routed; and (3) where or who the facsimile data was transmitted from.

17. The data processing system of claim 16 wherein the software which uses the second format routes one of either the first data file or the second data file in order to communicate the facsimile data to a destination computer connected to the control computer via a local area network.

18. The data processing system of claim 16 wherein the software for converting also translates a first human written language into a second human written language wherein a sender sent the message to the control computer in the first human written language and the control computer converts from the first human written language to the second human written language to provide language translation for a FAX destination user.

19. The data processing system of claim 16 wherein the software for converting is an optical character recognition algorithm which converts the first data file to text characters.

20. The data processing system of claim 19 wherein the optical character recognition algorithm can recognize characters selected from a group consisting of: hand-written characters and computer-printed characters.

21. The data processing system of claim 19 wherein the optical character recognition algorithm converts only a first page of the facsimile data to find an alphanumeric destination from the first page.

22. The data processing system of claim 16 wherein a printer is coupled to the control computer for printing facsimile data.

23. The data processing system of claim 16 wherein a control program is accessed via the control computer to store fax logging information comprising a date and a time the facsimile data was received by the control computer.

24. The data processing system of claim 16 wherein a plurality of end-user computers are coupled to the control computer where at least one of the end-user computers in the plurality of end-user computers is a destination for the facsimile data.

25. The data processing system of claim 24 wherein the facsimile data is transferred from the control computer to the at least one of the end-user computers via an electronic mail program stored in both the end-user computers and the control computer.

26. A data processing system for processing facsimile (FAX) transmissions, the data processing system comprising:
a modem having an input for receiving facsimile data from a serial communication line and an output for providing the facsimile data;
a control computer coupled to the output of the modem for receiving the facsimile data from the modem;
a plurality of end-user computers coupled to the control computer via a network;
a memory, accessible by the control computer, the memory comprising:
a first plurality of binary values for receiving the facsimile data from the modem and storing the facsimile data in a first data file in a first format;
a second plurality of binary values for converting the first data file to a second format which is stored in a second data file, the second plurality of binary values also translates a first human written language into a second human written language wherein a sender sent the message to the control computer in the first human written language and the second plurality of binary values converts from the first human written language to the second human written language to provide built-in language translation capability for a FAX destination user; and
a third plurality of binary values which accesses the second format in the second data file to identify a selected end-user computer in the plurality of end-user computers, the selected end-user computer being a destination of the facsimile data initially received by the modem.
a default computer which is coupled to the control computer for receiving the facsimile data if the software which uses the second format cannot correctly determine where to route the facsimile data in the data processing system; and
wherein at least one of the software for receiving, the software for converting, or the software which uses the second format interfaces with control software to keep a log file, the log file storing information regarding the facsimile data, the information being: (1) a time indicator for either receipt or final destination routing of the facsimile data; (2) a destination to which the facsimile data was routed; and (3) where or who the facsimile data was transmitted from.

27. A method for routing facsimile transmissions comprising the steps of:
receiving a facsimile transmission in a first data format;
converting the facsimile transmission to a second data format;
scanning the second data format to determine a computer destination of the facsimile transmission and to translate the facsimile transmission into a text file, wherein any differences in human languages are translated to a known language, the text file is routed to a default computer when the destination is not discernible from the step of scanning;
electronically communicating the text file to the computer destination identified in the step of scanning wherein the known language is understood by a human recipient at the computer destination;
storing, in a log file, (1) the date and time of receipt of the facsimile transmission, or the date and time of the electronic communicating of the facsimile transmission; (2) an identification of a sender of the facsimile transmission; and (3) an identifier of the human recipient of the text file or an identifier of the destination computer.

28. The method of claim 27 wherein the step of electronically communicating the facsimile transmission further comprises:

transmitting the facsimile transmission to the destination via an electronic mail protocol.

29. The method of claim 27 wherein the step of scanning the second data format to determine the destination further comprises:

scanning the second data format for an alphanumeric string which will indicate the destination.

30. The method of claim 27 wherein the destination is at least one computer accessible by a local area network.

31. The method of claim 27 wherein the step of converting comprises:

scanning the first data format to recognize patterns which can be interpreted as alphanumeric characters, the alphanumeric characters being stored in the second data format.

32. The method of claim 27 wherein the step of electronically communicating comprises:

printing the facsimile transmission to paper via a printer.

33. The method of claim 27 wherein the recitation of routing to a default computer further comprises:

communicating the facsimile transmission or text file to the default computer to be processed by a human user wherein the human user will determine the destination.

34. The method of claim 27 wherein the step of storing in a log file comprises:

electronically recording a plurality of facsimile transmissions as they are received and communicated, the plurality of facsimile transmission being recorded in a serial manner in the log file.

35. The method of claim 27 wherein the step of scanning comprises:

finding the destination wherein the destination is a destination which is patterned matched with a smallest error if no exact zero-error pattern match is found for the destination.

36. A method for routing facsimile transmissions through a computer system, the method comprising the steps of:

receiving a facsimile transmission wherein the facsimile transmission is received in a first data format;

converting the first data format of the facsimile transmission to a second data format which is textual;

parsing the second data format in a textual manner to identify at least one alphanumeric string within the second data format;

pattern matching the at least one alphanumeric string with at least one predetermined strings stored in memory to find a matching string wherein if no exact match is made between the at least one alphanumeric string and the at least one predetermined strings, a closest string in the at least one predetermined strings is used as the matching string when error tolerances in the matching are not too extreme;

setting a facsimile destination to either: (1) a default destination if no matching string in the at least one predetermined strings is found in the step of pattern matching; or (2) an actual destination if a matching string is found in the step of pattern matching;

electronically communicating the facsimile transmission to one of either the default destination or the actual destination depending upon the step of setting;

logging the occurrence of the step of electronically communicating in a log file for future reference.

37. A method for routing facsimile transmissions through a computer system, the method comprising the steps of:

(a) receiving a facsimile transmission wherein the facsimile transmission is received in a first data format;

(b) converting the first data format of the facsimile transmission to a second data format which is textual, the converting performing human language translation when needed;

(c) scanning the second data format in a textual manner to identify a matching alphanumeric string within the second data format which matches at least one predetermined string stored in memory, if no exact match is found between the second data format and the at least one predetermined string, the step of scanning performs an error analysis to find a most-closely associated string matching string to use as the matching string or assigns a default matching string as the matching string if error analysis passes a predetermined error threshold;

(d) setting a facsimile destination based upon the matching string from step (c);

(e) electronically communicating the facsimile transmission to the facsimile destination;

(f) logging information from the steps (a) through (e) in a log file; and (f) repeating steps (a) through (f) for a plurality of facsimile transmissions.

38. An electronic facsimile communicator stored via storage media, the storage media comprising:

a first plurality of binary values for receiving a facsimile transmission and storing the facsimile transmission in a first data format;

a second plurality of binary values for transforming the first data format to a second data format;

a third plurality of binary values for scanning the second data format to determine a recipient of the facsimile transmission out of a plurality of potential recipients in a local area network, if no direct recipient is determined, a default recipient or a recipient identified by the third plurality of binary values as being the most likely intended recipient of the facsimile transmission is set to be the recipient;

a fourth plurality of binary values for electronically routing the facsimile transmission to a recipient chosen from the plurality of potential recipients by the scanning performed by the third plurality of binary values; and a fifth plurality of binary values for storing log data to keep a history of past electronic routings of facsimile data.

39. An electronic facsimile communicator comprising:

means for receiving a facsimile transmission and storing the facsimile transmission in a first data format;

means for transforming the first data format to a second data format;

means for translating the second data format or the first data format from a first human language to a second human language wherein: (1) the first human language is a language used in the facsimile transmission; (2) the first human language is not capable of being scanned to determine a recipient; and (3) the recipient of the facsimile data cannot understand the first language but can understand the second human language;

means for scanning the second data format to determine the recipient of the facsimile transmission out of a plurality of potential recipients in a local area network, if no direct recipient is determined, a default recipient or a recipient identified by the means for scanning as being the most likely intended recipient of the facsimile transmission is set to be the recipient;

means for electronically routing the facsimile transmission to the recipient chosen from the plurality of potential recipients by the means for scanning; and means for storing log data to keep a history of past electronic routings of facsimile data.

* * * * *